2,728,705

STERILE PENICILLIN COMPOSITIONS AND THEIR PREPARATION

Malcolm D. Bray, Noblesville, Ind., assignor to Eli Lilly and Company, Indianapolis, Ind., a corporation of Indiana No Drawing. Application August 21, 1951, Serial No. 242,983

7 Claims. (Cl. 167—65)

This invention relates to penicillin and more particularly to the sterilization of aqueous suspensions of procaine penicillin.

Ready to use aqueous suspensions of procaine penicillin provide a convenient and efficient method of securing adequate penicillin therapy and avoiding many of the possibilities of contamination that exist when the suspension must be made up in the field just prior to administration. However, the manufacture of ready to use suspensions gives rise to other sterility problems which are difficult of solution.

Resistant forms of yeasts and molds are undoubtedly frequently introduced into those procaine penicillin suspensions which are made up just prior to use, but their presence can not be detected inasmuch as a period of several days to several weeks is required to develop a sufficiently heavy growth phase to be observable. However, with ready to use suspensions which may not be used until weeks or months after their manufacture, there is ample opportunity for the development of yeasts and molds and other organisms not susceptible to the action of penicillin, and consequently without adequate precautionary methods, heavily contaminated preparations can result. The usual methods of sterilizing compositions containing the resting or spore forms of yeasts and molds consists in autoclaving the contaminated material at about 120° C. for an extended period of time, or alternatively subjecting the contaminated material to temperature of 100° C. for a period of one hour on each of three successive days during which time any resting or spore forms of the organisms are converted to their vegetable forms in which state they are sensitive to and are killed by the heat. For obvious reasons neither of these methods are suitable for the sterilization of procaine penicillin suspensions. A degree of success in avoiding heavy yeast or mold contaminations has been secured by incorporating in the procaine penicillin suspension a lower alkyl ester of p-hydroxybenzoic acid which is more or less specific as an antifungal agent. Although phenol is an effective fungicidal agent, it can not be used successfully with procaine penicillin suspensions inasmuch as it reacts with the penicillin to give products which interfere with the suspendability and injectability of the suspensions. Moreover, even despite the presence of these antifungal agents, yeasts and molds not infrequently develop in the procaine penicillin suspensions and consequently reworking of the entire lot of ampouled material is required or an individual ampouled check must be made to select and discard contaminated ampoules. It is apparent from the foregoing considerations that a certain and sure method of sterilizing the procaine penicillin suspension is highly desirable.

By this invention there are provided sterile aqueous suspensions of procaine penicillin and an efficient method of sterilizing aqueous suspensions of procaine penicillin. The method provided hereby is certain in its action and has no deleterious effect on the procaine penicillin suspension either as regards the stability of the procaine penicillin, its injectability or its suitability for therapeutic purposes.

The method of this invention comprises adding to the procaine penicillin suspension to be sterilized a quantity of formaldehyde in the amount of about 1 part of formaldehyde in about 1000 to 5000 parts of procaine penicillin suspension, the parts being expressed in weight. The formaldehyde can be added in the form of a solution as for example 40 percent formalin solution, or by passing gaseous formaldehyde into the suspension or by adding the requisite amount of paraformaldehyde. Lesser amounts of formaldehyde, for example 1 part in 10,000 parts of suspension, can be employed and such lesser amounts can provide adequate sterilization, with however, less certain results than are obtainable with the higher range of concentration mentioned above. The use of higher concentrations than those specified above are unnecessary for sterilization and hence preferably are avoided.

Surprisingly, although the formaldehyde when first added exists in the composition in a free state it gradually disappears so that sensitive formaldehyde tests fail to detect any free formaldehyde. Thus it appears that the formaldehyde when first added exerts its antimicrobial action (inclusive of both bactericidal and fungicidal action) and then becomes bound in some manner in a combination which lacks the irritating action upon living tissue which is a recognized and undesirable property of free formaldehyde. Furthermore, despite the well known characteristic of penicillin to decompose in the presence of even relatively minute amounts of compounds containing reactive organic groups, no decomposition of the penicillin as determined by its activity in oxford units can be observed in procaine penicillin compositions sterilized with formaldehyde.

At the present time aqueous procaine pencillin compositions marketed for therapeutic purposes comprise a mixture of from 300,000 to 600,000 oxford units per ml. of suspension together with stabilizing agents such as buffers, suspending agents such as sodium carboxymethylcellulose and one or more antimicrobial agents. This invention is applicable to any of these suspensions as well as to similarly constituted compositions, although as will be understood the sterilization afforded by the formaldehyde in accordance with this invention eliminates the necessity of including other antimicrobiological agents in the compositions.

An illustrative example of a procaine penicillin suspension employing this invention is as follows:

| | Parts |
|---|---|
| Procaine penicillin | 28.4 |
| Sodium carboxymethylcellulose | 0.09 |
| Sodium citrate | 0.92 |
| Water | 69.58 |
| Formalin solution (40 percent) | 0.06 |

The proportions given above are expressed as parts by weight. After mixing the composition, it is preferably allowed to stand a few days before distribution. During the standing period the formaldehyde exerts its fungicidal and antibacterial activity, and gradually disappears so that it no longer can be found in free state.

In place of the formalin solution employed above, paraformaldehyde can be employed in amounts to provide formaldehyde concentration equivalent to that given by the use of the formalin solution. Alternatively, the desired concentration of formaldehyde can be secured by passing gaseous formaldehyde into the well stirred suspension.

It should be understood that the above composition is illustrative only, and that this invention can be successfully applied to other aqueous procaine penicillin compositions of similar nature.

I claim:
1. A method of sterilizing an aqueous procaine penicillin suspension which consists in adding formaldehyde in relatively small amount to said suspension.
2. The method of sterilizing an aqueous procaine penicillin suspension which consists in adding formaldehyde to said suspension in an amount of about 1 part of formaldehyde in 1000 to 5000 parts by weight of said procaine penicillin suspension, thereby to destroy the microbial forms contained in said suspension.
3. A method according to claim 2 in which the formaldehyde is added as formalin.
4. A method according to claim 2 in which the formaldehyde is added as gaseous formaldehyde.
5. A method according to claim 2 in which the formaldehyde is added as paraformaldehyde.
6. An aqueous suspension of procaine penicillin to which has been added a relatively small amount of formaldehyde.
7. An aqueous suspension of procaine penicillin to which formaldehyde has been added in the amount of about 1 part of formaldehyde in 1000 to 5000 parts by weight of said procaine penicillin suspension.

References Cited in the file of this patent
UNITED STATES PATENTS

| | | |
|---|---|---|
| 2,515,898 | Rhodehamel | July 18, 1950 |
| 2,550,398 | Barol | Apr. 24, 1951 |

OTHER REFERENCES

Ramon et al.: "Stabilizing Penicillin With Formaldehyde," Manufacturing Chemist and Manufacturing Perfumer, August 1947, vol. XVIII, Number 8, p. 364.

Biological Abstracts, November 1947, p. 2239, entry 22728. Ramon et al.: "Les solutions de streptomycine. Leur stabilite. Action du Formol."

Fleury et al.: "Contributions à l'etude de la stabilisation des solutions aqueuses de penicilline," Ann. Pharm. Franc., 1949, pp. 529–535.

Hobbs, "Prelim. Observ. on Stabilisation of Penic. Sol'ns with Hexamine," J. Pharm. and Pharmacol., November 1952, pp. 911–916.